(12) United States Patent
Chen et al.

(10) Patent No.: US 12,136,821 B2
(45) Date of Patent: *Nov. 5, 2024

(54) REAL-TIME ESTIMATION OF CONTRIBUTIONS FROM CLASSES OF ENERGY GENERATORS IN RESIDUAL LOAD SIGNALS

(71) Applicant: Utopus Insights, Inc., Valhalla, NY (US)

(72) Inventors: Bei Chen, Dublin (IE); Jean-Baptiste Remi Fiot, Dublin (IE); Vincent Petrus Anthonius Lonij, Dublin (IE); Mathieu F. Sinn, Dublin (IE)

(73) Assignee: Utopus Insights, Inc., Valhalla, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/193,096

(22) Filed: Mar. 30, 2023

(65) Prior Publication Data
US 2023/0253798 A1    Aug. 10, 2023

Related U.S. Application Data

(63) Continuation of application No. 17/306,923, filed on May 3, 2021, now Pat. No. 11,631,978, and a
(Continued)

(51) Int. Cl.
*H02J 13/00* (2006.01)
*H02J 3/00* (2006.01)
(Continued)

(52) U.S. Cl.
CPC .............. *H02J 3/381* (2013.01); *H02J 3/00* (2013.01); *H02J 3/38* (2013.01); *H02J 3/466* (2020.01);
(Continued)

(58) Field of Classification Search
CPC ...... H02J 3/381; H02J 3/00; H02J 3/38; H02J 3/466; H02J 13/00002; H02J 13/00017;
(Continued)

(56) References Cited

U.S. PATENT DOCUMENTS 6,937,946 B1    8/2005 Culp et al.
7,409,303 B2    8/2008 Yeo et al.
(Continued)

FOREIGN PATENT DOCUMENTS

EP    2290328 A1    3/2011
EP    2570775 A1    3/2013
(Continued)

OTHER PUBLICATIONS

A Novel Formulation for Unit Commitment with Wind Power Considering Production Cost of Every Generator, By: Guowei Hu (Year:2012).
(Continued)

*Primary Examiner* — Jigneshkumar C Patel
(74) *Attorney, Agent, or Firm* — Ahmann Kloke LLP

(57) ABSTRACT

Various embodiments manage energy generation in a power generation and distribution system. In one embodiment, a set of residual load data is obtained for a given period of time measured at one or more nodes within a power generation and distribution system. The set of residual load data encodes a set of power flow signals. The set of residual load data is analyzed. An amount of power contributed to the set of residual load data by at least one energy generator class is determined based on the analysis of the set of residual load data.

18 Claims, 6 Drawing Sheets

Related U.S. Application Data continuation of application No. 16/379,731, filed on Apr. 9, 2019, now Pat. No. 10,998,729, and a continuation of application No. 14/931,993, filed on Nov. 4, 2015, now Pat. No. 10,256,633.

(51) Int. Cl.
*H02J 3/38* (2006.01)
*H02J 3/46* (2006.01)

(52) U.S. Cl.
CPC .. *H02J 13/00002* (2020.01); *H02J 13/00017* (2020.01); *H02J 13/00034* (2020.01); *H02J 2203/20* (2020.01); *H02J 2300/20* (2020.01); *H02J 2300/24* (2020.01); *Y02E 10/56* (2013.01); *Y02E 40/70* (2013.01); *Y02E 60/00* (2013.01); *Y04S 10/12* (2013.01); *Y04S 10/123* (2013.01); *Y04S 10/30* (2013.01); *Y04S 40/20* (2013.01)

(58) Field of Classification Search
CPC ............. H02J 13/00034; H02J 2203/20; H02J 2300/20; H02J 2300/24; Y02E 10/56; Y02E 40/70; Y02E 60/00; Y04S 10/12; Y04S 10/123; Y04S 10/30; Y04S 40/20
USPC ........................................................ 700/287
See application file for complete search history.

(56) References Cited

U.S. PATENT DOCUMENTS

| | | | |
|---|---|---|---|
| 7,558,703 | B2 | 7/2009 | Stoupis et al. |
| 8,560,134 | B1 | 10/2013 | Lee |
| 8,600,572 | B2 | 12/2013 | Sri-Jayantha |
| 8,718,829 | B2 | 5/2014 | Coyne et al. |
| 2007/0043549 | A1 | 2/2007 | Evans et al. |
| 2011/0082597 | A1 | 4/2011 | Meagher |
| 2012/0091730 | A1 | 4/2012 | Stuermer et al. |
| 2012/0133333 | A1 | 5/2012 | Morioka et al. |
| 2012/0278272 | A1 | 11/2012 | Kim et al. |
| 2013/0057214 | A1 | 3/2013 | Stevens |
| 2013/0213038 | A1 | 8/2013 | Lazaris |
| 2014/0188410 | A1 | 7/2014 | Kerrigan et al. |
| 2016/0006248 | A1 | 1/2016 | Sakuma et al. |

FOREIGN PATENT DOCUMENTS

| | | |
|---|---|---|
| WO | 2012052868 A2 | 4/2012 |
| WO | 2014113756 A2 | 7/2014 |

OTHER PUBLICATIONS

Ba, A., et al., "Adaptive Learning of Smoothing Functions: Application to Electricity Load Forecasting," Advances in Neural Information Processing Systems Dec. 25, 2012, pp. 1-9.

Diaz, D., et al., "Controlled Power Distributed Photovoltaic System Using Solar Energy Forecast," International Conference on Renewable Energies and Power Quality, Mar. 28-30, 2012, pp. 1-5.

Hastie, T., et al., "Generalized Additive Models," Statistical Science, Aug. 1986, pp. 297-318, vol. 1, No. 3.

Jebaraj, S., et al., "A Review of Energy Models", Renewable and Sustainable Energy Reviews, Sep. 2004, pp. 281-311, vol. 10.

Kolter, J., et al., "Approximate Inference in Additive Factorial HMMs with Application to Energy Disaggregation," International Conference on Artificial Intelligence and Statistics, Apr. 21-23, 2012, pp. 1-11.

Kolter, J., et al., "Energy Disaggregation via Discriminative Sparse Coding," Neural Information Processing Systems, Dec. 6-10, 2010, pp. 1-9.

Marco Pruckner: A Simulation Model to Analyze the Residual Load During the Extension of Highly Fluctuating Renewables in Bavaria, Germany, 4th International Conference on Power Engineering , Energy and Electrical Drives, Istanbul, Turkey, May 13-17, 2013.

Mohan, R., et al., "Solar Energy Disaggregation using Whole-House Consumption Signals," NILM Workshop, Jun. 3, 2014, pp. 1-4.

Nelder, J., et al., "A Simplex Method for Function Minimization," The Computer Journal, Jan. 1965, pp. 308-313, vol. 7, No. 4.

Rahman, Md., et al., "Novel Distributed Power Generating System of PV-ECaSS Using Solar Energy Estimation," IEEE Transactions on Energy Conversion, Jun. 2007, pp. 1-10, vol. 22, Issue 2.

Sharma, N., et al., "Predicting Solar Generation from Weather Forecasts Using Machine Learning," IEEE International Conference on Smart Grid Communications, Oct. 2011, pp. 1-6.

Taieb, S., et al., "A Gradient Boosting Approach to the Kaggle Load for Forecasting Competition," International Journal of Forecasting, Apr. 29, 2013, pp. 1-19.

Wood, S., "Stable and Efficient Multiple Smoothing Parameter Estimation for Generalized Additive Models," Journal of the American Statistical Association, Mar. 2004, pp. 1-43.

Yoon, J., et al., "Bayesian Separation of Wind Power Generation Signals," 21st International Conference on Pattern Recognition, Nov. 11-15, 2012, pp. 1-4.

REAL-TIME ESTIMATION OF CONTRIBUTIONS FROM CLASSES OF ENERGY GENERATORS IN RESIDUAL LOAD SIGNALS

CROSS-REFERENCE TO RELATED APPLICATIONS

This application is a continuation of U.S. patent application Ser. No. 17/306,923, filed May 3, 2021, entitled "REAL-TIME ESTIMATION OF CONTRIBUTIONS FROM CLASSES OF ENERGY GENERATORS IN RESIDUAL LOAD SIGNALS," which is a continuation of Ser. No. 16/379,731, filed Apr. 9, 2019, entitled "REAL-TIME ESTIMATION OF CONTRIBUTIONS FROM CLASSES OF ENERGY GENERATORS IN RESIDUAL LOAD SIGNALS," now U.S. Pat. No. 10,998,729, which is a continuation of U.S. patent application Ser. No. 14/931,993, filed Nov. 4, 2015, entitled "REAL-TIME ESTIMATION OF CONTRIBUTIONS FROM CLASSES OF ENERGY GENERATORS IN RESIDUAL LOAD SIGNALS," now U.S. Pat. No. 10,256,633, all of which are incorporated by reference herein.

BACKGROUND

The present disclosure generally relates to power distribution networks, and more particularly relates to estimating and managing contributions of energy generators in residual load signals of an electric power transmission and distribution network.

The present disclosure generally relates to power distribution networks, and more particularly relates to estimating and managing contributions of energy generators in residual load signals of an electric power transmission and distribution network.

Power distribution networks are complex systems with many different kinds of devices and users. Electricity is produced within a power distribution network from non-renewable and renewable energy sources. Accurate knowledge of the different types of devices connected to the network is essential for utility operations.

SUMMARY

In one embodiment, a method for managing energy generation in a power generation and distribution system is disclosed. The method comprises obtaining a set of residual load data for a given period of time measured at one or more nodes within a power generation and distribution system. The set of residual load data encodes a set of power flow signals. The set of residual load data is analyzed. An amount of power contributed to the set of residual load data by at least one energy generator class is determined based on the analysis of the set of residual load data.

In another embodiment, an information processing system for managing energy generation in a power generation and distribution system is disclosed. The information processing system memory and a processor that is operably coupled to the memory. The information processing system further comprises an energy generation manager. The energy generation manager is operably coupled to the memory and the processor and is configured to perform a method. The method comprises obtaining a set of residual load data for a given period of time measured at one or more nodes within a power generation and distribution system. The set of residual load data encodes a set of power flow signals. The set of residual load data is analyzed. An amount of power contributed to the set of residual load data by at least one energy generator class is determined based on the analysis of the set of residual load data.

In yet another embodiment, a computer program product for managing energy generation in a power generation and distribution system is disclosed. The computer program product comprises a storage medium readable by a processing circuit and storing instructions for execution by the processing circuit for performing a method. The method comprises obtaining a set of residual load data for a given period of time measured at one or more nodes within a power generation and distribution system. The set of residual load data encodes a set of power flow signals. The set of residual load data is analyzed. An amount of power contributed to the set of residual load data by at least one energy generator class is determined based on the analysis of the set of residual load data.

BRIEF DESCRIPTION OF THE DRAWINGS

The accompanying figures where like reference numerals refer to identical or functionally similar elements throughout the separate views, and which together with the detailed description below are incorporated in and form part of the specification, serve to further illustrate various embodiments and to explain various principles and advantages all in accordance with the present disclosure, in which.

DETAILED DESCRIPTION

Operating Environment

Figure 1:
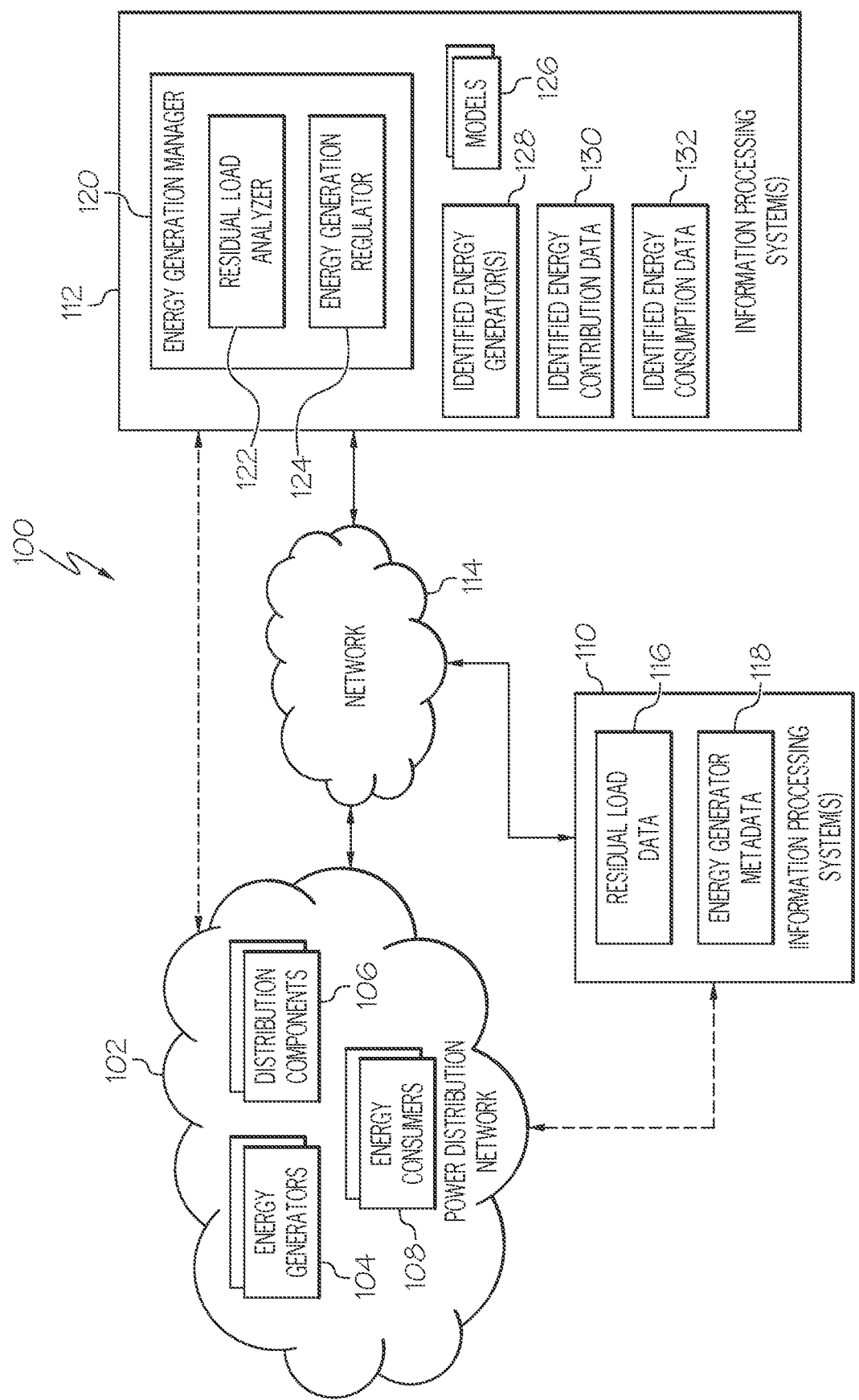
FIG. 1 is a block diagram illustrating one example of an operating environment according to one embodiment of the present disclosure.

FIG. 1 shows one example of an operating environment 100 for identifying classes of energy generators coupled to a power network node and their contribution to measured residual load signals according to one embodiment of the disclosure. The operating environment 100 comprises one or more power distribution networks 102 comprising energy generators 104 (also referred to herein as "energy sources"), distribution components 106, and energy consumers 108. Energy generators 104 comprise non-renewable energy (NRE) generators such as fossil fuel and nuclear based energy generators and renewable energy (RE) generators such as photovoltaic (PV), wind, and wave based energy generators. Distribution components 106 (e.g., substations, wiring, etc.) distribute electricity generated by the energy generators 104 to the energy consumers 108 such as business, commercial, and residential customers.

In one embodiment, one or more information processing systems 110, 112 are disposed within the power distribution network and/or are communicatively coupled to the power system 102 via one or more other networks 114, or are coupled directly to the power system 102. The network(s) 114 comprises cloud and/or non-cloud based technologies, wireless communication networks, wired networks, non-cellular networks such as Wireless Fidelity (WiFi) networks, public networks such as the Internet, private networks, and/or the like. The wireless communication networks support any wireless communication standard such as, but not limited to, Global System for Mobile Communications (GSM), Code Division Multiple Access (CDMA), Time Division Multiple Access (TDMA), General Packet Radio Service (GPRS), Frequency Division Multiple Access (FDMA), Orthogonal Frequency Division Multiplexing (OFDM), or the like. The wireless communication networks include one or more networks based on such standards. For example, in one embodiment, a wireless communication network comprises one or more of a Long Term Evolution (LTE) network, LTE Advanced (LTE-A) network, an Evolution Data Only (EV-DO) network, a General Packet Radio Service (GPRS) network, a Universal Mobile Telecommunications System (UMTS) network, and the like.

The information processing systems 110, 112, in one embodiment, are information processing systems such as desktop and portable computing devices and/or wireless communication devices. Examples of wireless communication devices include two-way radios, cellular telephones, mobile phones, smartphones, two-way pagers, wireless messaging devices, wearable computing devices, tablet computers, personal digital assistants, and other similar devices. At least one of the information processing systems 110 comprises residual load data 116 and environmental data 118. Residual load data 116 comprises one or more time series and/or an instantaneous measurements of power flow signals measured at, for example, a power line (or other component) of a given node within the power system 102. These power flow signals are the result of power consumption and power generation of devices connected to the node. Residual load is the result of the collective behavior of energy consumers and possible some energy generators. Stated differently, the power flow signals encode the residual load at the node, which is the difference between demand for energy (electricity), including losses caused by transmission/distribution/transformers, etc. and the energy generated by energy generators. The residual load data 116 can include historical residual load data and/or real-time residual load data and is obtainable on-demand and/or at predefined intervals.

Environmental data 118 is external data associated with various classes of energy generators 104 such as renewable energy sources. In one embodiment, the environmental data 118 is a time series (or an instantaneous set) of collected data such as external environmental (e.g. wind, irradiance, etc.) and/or generator configuration/operational factors that affect energy production by a generator 104. For example, environmental data for PV-based energy generators can include irradiance obtained from a weather model or sensors, while environmental data for wind-based energy generators can include wind speed obtained from a weather model or sensors. In one embodiment, environmental data 118 for each energy generator class of interest is obtained (e.g., from measurements, models, etc.) and stored within the information processing system 110.

FIG. 1 further shows that at least one of the information processing systems 112 comprises an energy generation manager 120 that includes a residual load analyzer 122 and an energy generation regulator 124. The residual load analyzer 122 utilizes various models 126, the residual load data 116, and (optionally) the environmental data 118 to identify the type of energy generator(s) contributing to residual load of the network, its contribution to the residual load, and a pure consumption characteristic of the residual load. The energy generation manager 120 stores the data generated by the residual load analyzer 122 as identified energy generator data 128, energy generator contribution data 130, and energy consumption data 132.

The energy generation regulator 124, in one embodiment, utilizes this stored data to perform various operations such as adjusting the production of energy by one or more energy generators 102, regulating the amount of reserve generation that is active, etc. For example, the regulator 124 can detect a surplus or deficiency of energy based on current or historical demand (identified from the consumption data 132) and the identified contribution data 128. The regulator 124 can then automatically communicate with one or more information processing systems and/or sensors coupled to an energy generator 102 to automatically adjust one or more operational parameters of the generator 102 to increase or decrease its energy production. The energy generators 102 can be adjusted dynamically and/or according to a predefined or forecasted schedule. In another example, the regulator 124 adjusts a number of reserve generators that are in a stand-by mode. For example, the regulator 124 can place one or more generators in a stand-by mode and/or place one or more generators in an active mode from a stand-by mode.

In another example, the regulator 124 transmits the stored data 128, 130, 132 to an information processing system for forecasting residual load, demand, consumption, and generation; schedule power plant energy generation; optimally utilize demand response and smart grid technologies; perform power market operation; economic analysis of the power network; and/or the like. The stored data 128, 130, 132 can be presented to one or more users via a display.

Power Distribution Networks

Figure 2:
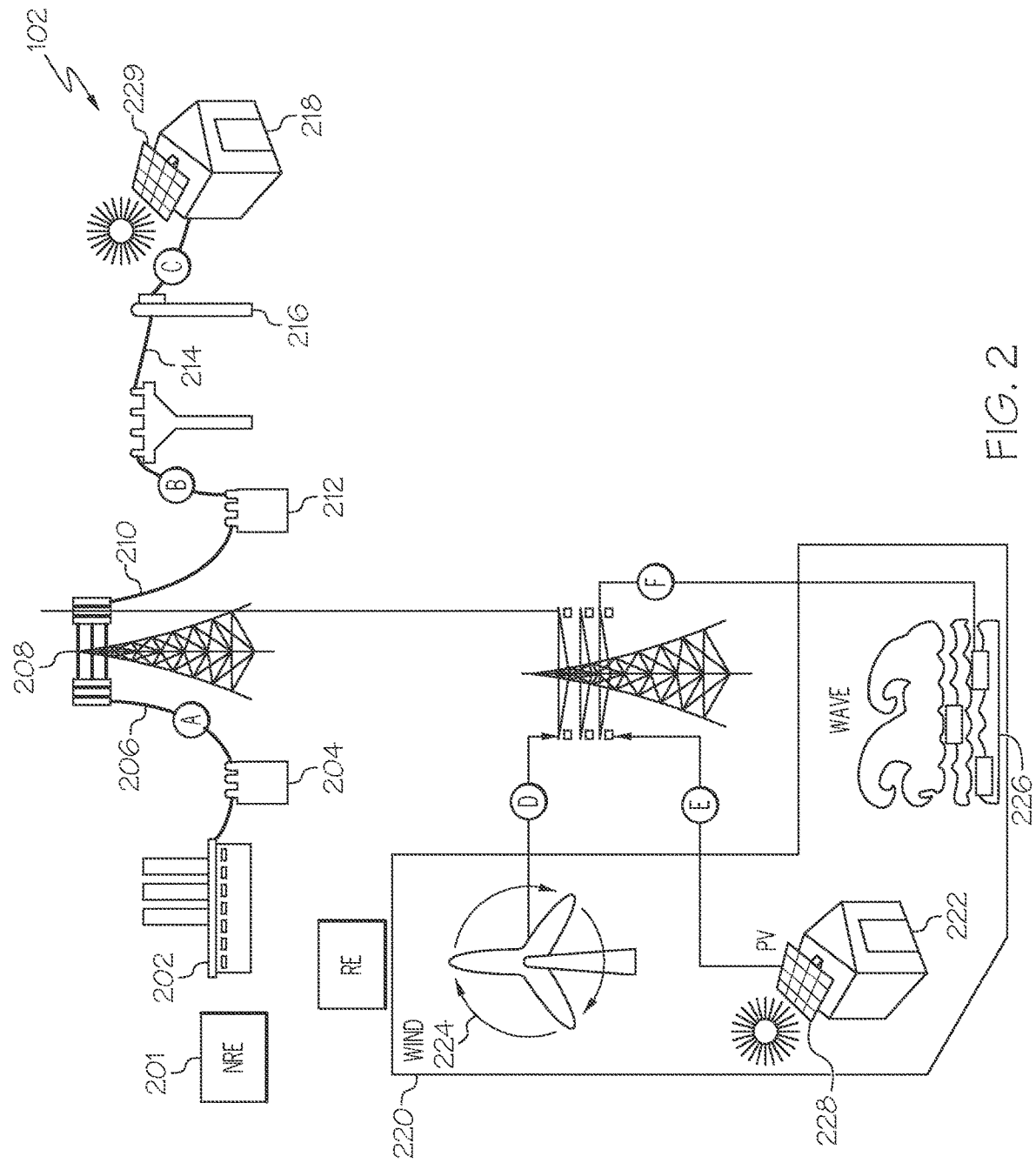
FIG. 2 illustrates one example of an electric infrastructure.

FIG. 2 shows an illustrative example of the various components of the power system 102. In this example, non-renewable energy sources 201 make up a grid comprising one or more power plants 202 that generate electricity which is directed to a transformer 204 that steps up the voltage in line 206 which line is connected to power transmission lines fixed on a high tension support 208 transmission. At a suitable location there is a line 210 to a neighborhood transformer 212 that steps down the voltage and directs the stepped down voltage to distribution lines 214 to carry electricity to houses. The voltage from distribution line 214 is transmitted to transformer 216 from which electricity enters, for example, a house 218. FIG. 2 also shows that the grid is augmented with renewable sources of energy 220 (e.g., PV 228 and 229, wind 224, and wave 226) that contribute energy to the grid. Some of this renewable generation may be connected to the low voltage side of transformers 212 or 216 or may be installed at a residence such as 218, 222.

As will be discussed in greater detail below, in one or more embodiments, the energy generation manager 120 receives residual load data for one or more nodes such as A, B, C, D, E, and F throughout the network 102 and provides estimates of the contribution of renewable generators connected to said node. For example, if the generation manager 120 receives the residual load signal at node E, the generation manager 120 identifies the renewable energy sources (if any), such as PV sources 228 installed at any residences coupled to the node E, and their contributions to the residual load signal. Similarly, if residual load is received from node B, contribution of renewable generators connected to distribution line 214, transformer 216 or residence 218 can be identified. If residual load at A is received, the total generation from one or more classes of generators, such as PV, connected anywhere to B, C, D, E, and F can be identified.

Real-Time Estimation of Residual Load Contribution

As discussed above, accurate knowledge of the different types of devices connected to a power network is essential for utility operations. However, in many instances, a utility provider may not know the locations of energy generators such as RE generators or their contributions to the electric state of the system. For example, a utility operator may want to know if PV-based energy generators are coupled to nodes B and E in FIG. 2 and what contribution of this class of generators is to the residual load measured at these nodes, while direct measurements of those contributions at the nodes are not available. Therefore, the energy generation manager 120 enables a utility provider to identify the types or classes of renewable energy sources at a given node (e.g., level or location) within the power network. For example, the energy generation manager 120 enables the utility provider to determine if there is PV-based energy generators located between customers and the transmission/distribution grid interface, or connected to a given substation within the power system 102, or installed locally at individual residences. Not only does the energy generation manager 120 determine the types of renewable energy sources at a given node within the network, the energy generation manager 118 also determines the contribution of the identified energy generator class to a state of the power network. For example, the energy generation manager 120 calculates the energy contribution of the energy source class to residual load of power signals measured at the node of interest.

In one embodiment, the energy generation manager 120 utilizes various models 126 to determine the classes or types of energy generators contributing to residual load of the power network. In this embodiment, two types of models 126 are utilized by the energy generation manager 118: a first type of model (e.g., a physical model) that describes the power generation behavior of each of the class(es) of energy generators of interest, and a second type of model (e.g., a generalized additive model (GAM)) for the collective power generation and consumption behavior of all remaining generators and consumers, respectively. In one embodiment, at least one physical model is utilized for each RE generator class (e.g., PV, wind, wave, etc.) that a utility operator wants to detect. For example, several models can be used for PV according to the technology, e.g. one model for stationary PV systems, one model for single-axis tracking, one model for dual-axis tracking, etc. However, any class of models can be used to represent generators to be detected within the power system 102. For example, the model can be a statistical model trained on a separate dataset of pure generation or it could already be provided as a time-series for which a scaling parameter is still to be determined.

As one example, the following irradiance to power model can be used to describe the power generation behavior of PV-based energy generators:

$$P(T, I, t) = C[1 - \alpha(T(t) - T_0)]\frac{I_{POA}(I, t)}{I_0}, \quad \text{(EQ. 1)}$$

where P is power, C is the nameplate capacity of the system, T is the temperature as a function of time (t), $\alpha$ is the temperature coefficient of efficiency, and $T_0$ and $I_0$ are the temperature and irradiance under standard test conditions (STC), respectively. The plane of array irradiance ($I_{POA}$) is obtained from global horizontal irradiance ($I_{GH}$) using:

$$I_{POA} = \vec{s} \cdot \vec{n} I_{GH} \quad \text{(EQ. 2),}$$

where {right arrow over (s)} is the incident vector of sunlight obtained from a solar position algorithm and {right arrow over (n)} is the normal vector of the plane of the PV module. This assumption can be relaxed as discussed below.

The normal vector {right arrow over (n)} is parameterized by two rotation angles: the tilt angle between the plane of the PV module and the ground ($\theta$) and the orientation angle of the module relative to North ($\varphi$) Normalized PV power production can be defined as p=P/C. This quantity represents the output of a PV system with a nameplate rating of 1 kW. Therefore, PV power is modeled as a linear function of p and the linear coefficient is interpretable as capacity in the optimization algorithm discussed below. It should be noted that although a PV-based model is utilized as one example throughout this disclosure, embodiments are not limited to PV-based energy generators and similar operations are performed for models associated with other types of energy generators.

In one embodiment, a generalized additive model is utilized to model the collective behavior of all remaining generators (i.e., all other generator classes except the generator class modeled by the physical model) and consumers contributing to the residual load signal(s). A generalized additive model is a class of non-linear regression models that describes the effect of inputs as an additive function of spline basis expansions. See, for example, T. J. Hastie and R. J. Tibshirani, Generalized additive models. CRC Press, 1990, vol. 43, which is hereby incorporated by reference in its entirety. The problem of load forecasting at a highly aggregated level (e.g., total demand of state) is discussed in S. Jebaraj and S. Iniyan, "A review of energy models," Renewable and Sustainable Energy Reviews, vol. 10, no. 4, pp. 281-311, 2006; A. Ba, M. Sinn, Y. Goude, and P. Pompey, "Adaptive learning of smoothing functions: Application to electricity load forecasting," Advances in Neural Information Processing Systems, 2012; S. B. Taieb and R. J. Hyndman, "A gradient boosting approach to the kaggle load forecasting competition," International Journal of Forecasting, vol. 30, no. 2, pp. 382-394, 2014, which are hereby incorporated by references in their entireties.

Let L(t) denote the load at time t. In general, the following GAM equation can be applied to describe the relationship between L and the exogenous variables ($X_1, \ldots, X_p$) at different aggregation levels. For m≥1, $$L(t) = \Sigma_{i=1}^{m} f_i(X_i(t)) + \epsilon(t) \quad \text{(EQ 3),}$$

where $f_i$ are represented by cubic splines; Et accounts for "random" effects not explained by GAM; $X_{i,t}$ are broadly categorized as calendar variables and weather variables: calendar variables include 1) time of day, 2) weekday (where Tuesday-Thursday are treated as equal), 3) time of year (a continuous variable which is 0 on 1st January and 1 on 31st December), 4) seasons, 5) holidays; weather variables include 1) dry bulb temperature (instantaneous value, mean and maximum values of the previous day) and lagged dry bulb temperatures, 2) dew point, 3) solar irradiance. If available, the model can also take into account real-time load information e.g., mean, minimum, maximum load on the previous day and other lagged load values.

The residual load analyzer 122 combines the models 126 for generation p and consumption L into a model for residual load r. The model estimate of residual load ($\hat{r}$) is defined as:

$$P(t)=L(t)+c \cdot p(t,T,I,\alpha,\theta,\varphi) \quad \text{(EQ 4)}$$

$$\Sigma_{i=1}^{P} f_i(X_i(t))+c \cdot p(t,T,I,\alpha,\theta,\varphi) \quad \text{(EQ 5)}.$$

Figure 3:
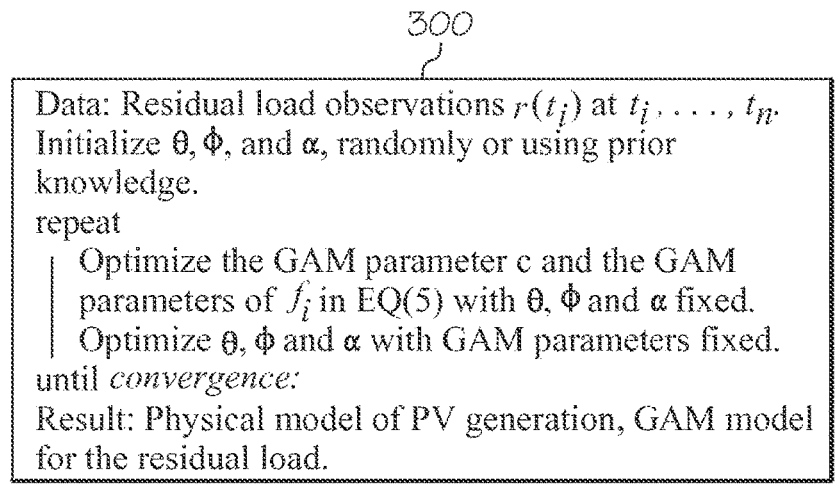
FIG. 3 illustrates a model optimization process for identifying a contribution by a class of energy generators to residual load and power consumption represented by the residual load within a power generation and distribution system according to one embodiment of the present disclosure.

The parameters of the $f_i$ for the GAM (e.g., cubic spline parameters) as well as the parameters of the physical model ($\theta$, $\varphi$) can now be determined by the residual load analyzer 122 from the residual load data 116, which comprises a set of measurements of residual load ($r_i$, $t_i$) obtained at times ($t_i$) using the algorithm for shown in FIG. 3. In particular, the algorithm 300 in FIG. 3 represents operations performed by the residual load analyzer 122 on residual load data 116 to identify an energy generation class, its contribution to the residual load data 116, and to also identify the consumption component of the residual load data 116. For example, FIG. 3 shows that the residual load analyzer 122 takes as input a set of residual load data 116 (residual load operations $r_i=r(t_i)$ at $t_1, \ldots, t_n$). Stated differently, the residual load analyzer 122 takes a set of historical residual load measurements as input. In addition, environmental data 118 such as weather measurements (or weather forecasts) can be obtained from an external source and optionally used as model inputs as well. In cases where a class of generators can be modeled accurately without the needs for weather data (e.g., if the time schedule of generation is known), and the load minus this generation can be accurately modeled as a function of time only, the environmental data 118 inputs can be omitted.

The residual load analyzer 122 initializes $\theta$, $\varphi$, and $\alpha$ randomly or using prior knowledge such as the environmental data 118. The residual load analyzer 122 then performs an optimization process on the residual load model $\vec{r}$ until convergence is obtained. The optimization process comprises optimizing the GAM parameter C (interpretable as PV capacity and the GAM parameters of $f_i$ in EQ 5 with $\theta$, $\varphi$, and $\alpha$ fixed. The optimization process further comprises optimizing $\theta$, $\varphi$, and $\alpha$ with GAM parameters fixed. If one or more or all of the parameters of the physical model (for example, $\theta$, $\varphi$, and $\alpha$) are already known from prior knowledge, either exactly or approximately, then they may optionally be kept fixed and need not be determined by the residual load analyzer 122.

Figure 4:
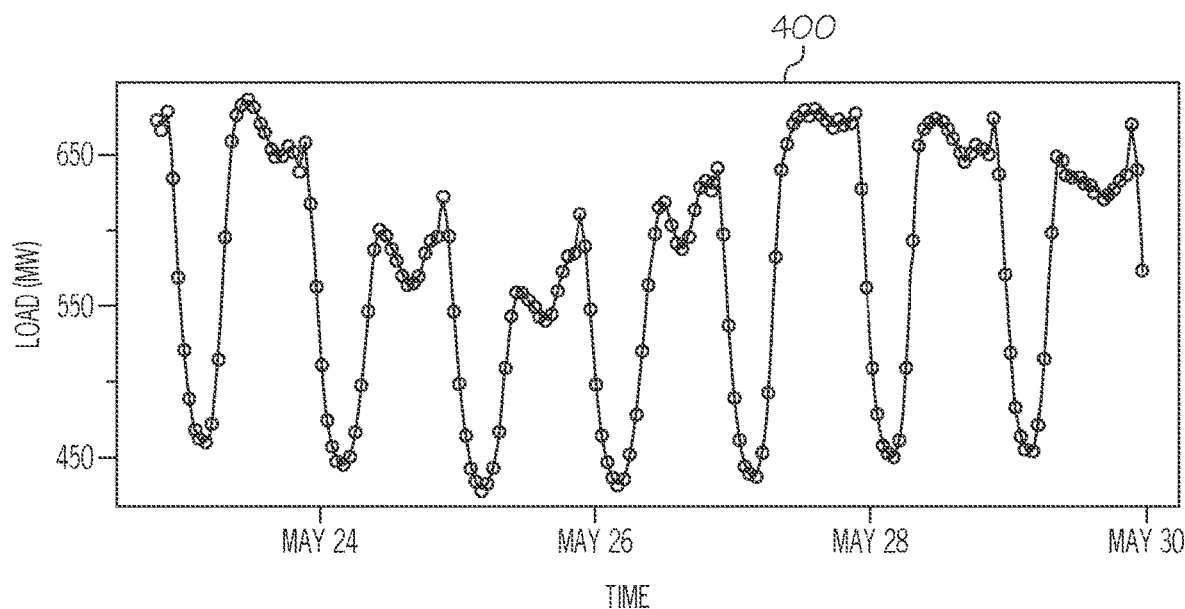
FIG. 4 shows one example of residual load data according to one embodiment of the present disclosure.

The result of the process shown in FIG. 4 is a physical model for PV generation and a GAM model for the residual load with optimal model parameters.

In more detail, both optimization components follow the same principle. A set of parameter values is to be found that minimizes (or maximizes) a chosen objective function. For example, the Sum of Squared errors between model output and the measured value can be selected as the objective function ($\Sigma_i(r(t_i)-\hat{r}(t_i)))^2$). The optimal set of parameters is then defined as the set of parameters for which the objective function is at a minimum. This optimal set of parameters can be found by repeatedly changing one or more parameters and re-evaluating the objective function until no further improvement to the object function can be achieved. Various efficient algorithms to perform this process are discussed in P. Adby, "Introduction to optimization methods," Springer Science & Business Media, 2013, which is hereby incorporated by reference in its entirety.

With respect to solving the GAM, if EQ. 5 is viewed as a GAM where p is taken to be a function of time only (i.e., with $\theta$, $\varphi$, and $\alpha$ fixed) then there several methods can be used by the residual load analyzer 122 to find the optimal values for C and the parameters of $f_i$. See, for example, S. N. Wood, "Stable and efficient multiple smoothing parameter estimation for generalized additive models," Journal of the American Statistical Association, vol. 99, no. 46, 2004; S. Wood, "Generalized additive models: an introduction with R," CRC press, 2006; and T. Hastie and R. Tibshirani, "Generalized additive models," Statistical science, pp. 297-310, 1986, which are hereby incorporated by reference in their entireties.

To find optimal parameters for a GAM, the residual load analyzer 122 utilizes 1) a set of basis-functions to parameterize $f_i$, and 2) a penalty term that is added to the objective function to impose smoothness. In one example, a set of basis-functions $u_j$ for $f_i$ is chosen such that $$f_i(X)=\Sigma_j \gamma_{ij} u_j(X) \quad \text{(EQ 6)}.$$

There are various choices for $u_j$, but in this example cubic splines is selected. In addition, to ensure a stable solution to EQ 6, a penalty term is introduced to the objective function as follows:

$$\text{objective function}=\Sigma_i(r(t_i)-\hat{r}(t_i))^2+\lambda \Sigma_j \int_t (f_j''(t))^2 dt \quad \text{(EQ 7)},$$

where $r(t_i)$ is the measured signal at time $t_i$, $\hat{r}(t_i)$ is the model output at time $t_i$, $\lambda$ is a smoothing parameter, and $f''_j$ is the second derivative of $f_i$. The parameters $\{p_{ij}\}$ can then be found using the process discussed above with respect to the optimization process. Alternatively, methods such as those in S. N. Wood, S. Wood, and T. Hastie can also be used.

With respect to optimizing the physical model parameters, if EQ 5 is viewed as a non-linear function of the parameters $\theta$, $\varphi$, and $\alpha$, i.e., with the values for C and expressions for $f_i$ taken as fixed (given in the form of EQ 6), the residual load analyzer 122 determines with $\theta$, $\varphi$, and $\alpha$ fixed using the process discussed above with respect to the optimization process. Various other methods such as that in P. Adby can be used as well. In one example, the residual load analyzer 122 utilizes the method from J. A. Nelder and R. Mead as implemented in the optim function in R. See J. A. Nelder and R. Mead "A simplex method for function minimization," The computer journal, vol. 7, no. 4, pp. 308-313, 1965, which is hereby incorporated by reference in its entirety.

After the residual load analyzer 122 applies the models 126 to the residual load data 116 and performs the optimization process discussed above, optimal parameters are obtained (some of which can be outputted). In the PV energy example, the parameter C is outputted and is interpreted as PV capacity during the period of time spanned by the historical residual load measurements. In addition, if the environmental data 118 needed to evaluate models is available for other time periods (or in real-time) the models 126 can be used to output time-series of both PV generation and consumption by evaluating EQ 1 and EQ 3 respectively. The above processes are repeated for each different energy generator to be detected. For example, the above processes are performed to determine if a wind-based energy generator, wave-based energy generator, and/or the like contributed/contributes to the residual load data 116, and what the contribution (if any) was/is.

As an illustrative example, consider the residual load data 400 shown in FIG. 4 measured for a given period of time. The residual load data is displayed in graph form where the x-axis comprises time values and the y-axis comprises measured load values. The residual load analyzer 122 takes this residual load data as an input along with environmental data such as weather measurements comprising temperature and irradiance for the period of time shown in the graph. The analyzer 122 applies the physical model (EQ 1) for PV-based energy generators and the GAM model (EQ 3) to the residual load data 400 and the environmental data. If the physical and GAM models have been previously optimized and the optimization is still sufficient (e.g., optimization was performed within a threshold period of time), the optimization process discussed above is not required to be performed. The residual load analyzer 122 applies the physical model (EQ 1) GAM model (EQ 3) with their optimal parameters to the residual load data 400.

If models have not been previously optimized or need to be optimized again, the optimization process discussed above is performed. For example, the models are combined into a model estimate of residual load according to EQs 4 and 5 and then optimized utilizing the process discussed above with respect to FIG. 3. The residual load analyzer 122, in this example, then outputs parameter C in EQ 5 as the PV capacity during the period of time shown in FIG. 4. Stated differently, the residual load analyzer 122 determines that the residual load data shown in FIG. 4 comprises a PV-based energy generator component, and also determines the contribution of the PV-based energy generator component to the residual load data.

Figure 5:
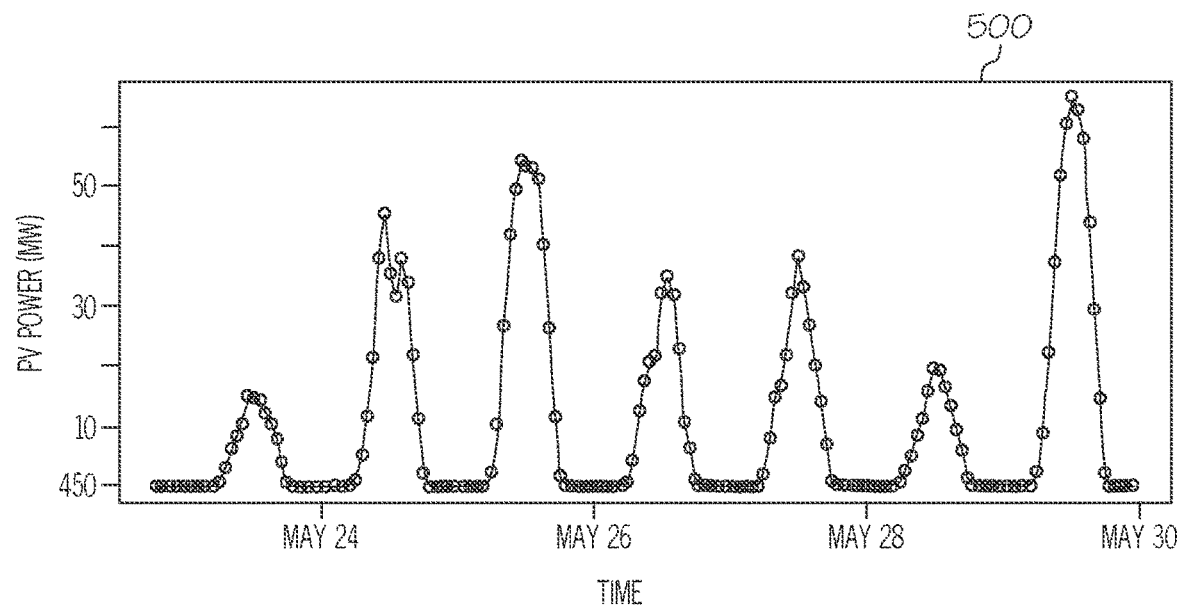
FIG. 5 shows one example of contribution by a PV-based energy generator class to the residual load of FIG. 5 according to one embodiment of the present disclosure.

For example, FIG. 5 shows the PV contribution 500 to the residual load data 400 of FIG. 4 as determined by the residual load analyzer 122. The PV contribution data 500 is shown in graph form where the x-axis comprises time values and the y-axis comprises PV power values. In this example, the residual load analyzer 122 estimated that there was a system of PV-based energy generators with an approximate capacity of 67 MW coupled to the node during the period of time represented by the residual load data 400. It should be noted that if PV-based energy generators were not coupled to the node, the estimated capacity would be null.

Figure 6:
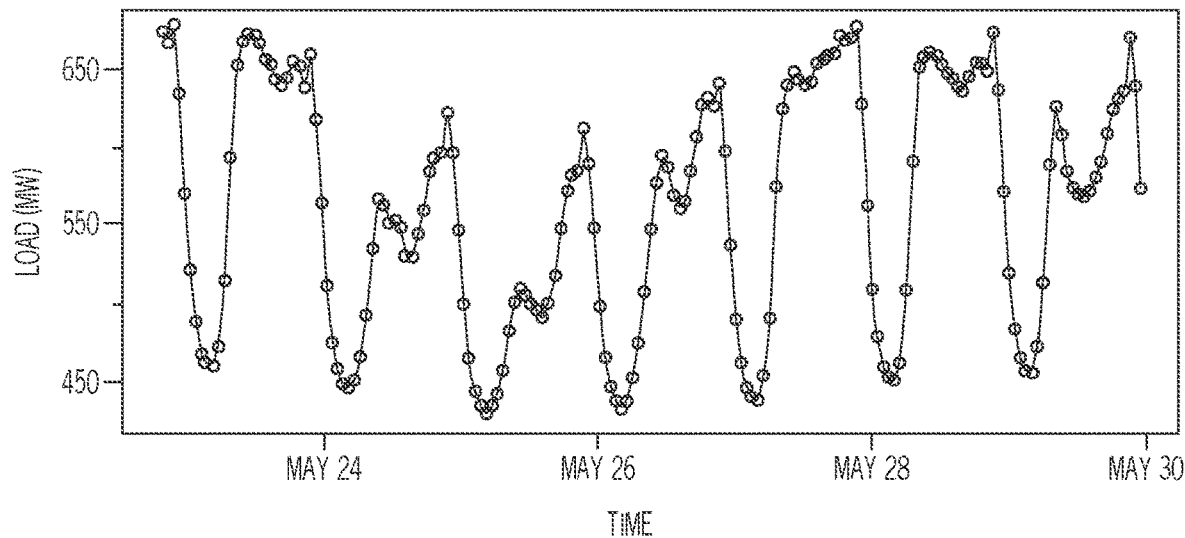
FIG. 6 shows one example of power consumption represented by the residual load data of FIG. 5 according to one embodiment of the present disclosure.

In addition to determining if the residual load data 400 shown in FIG. 4 comprises a PV-based energy generator component and its estimated contribution to the residual load data 400, the residual load analyzer 122 also estimates a pure consumption component of the residual load data utilizing EQ 3, which has been optimized according to the process shown in FIG. 3. For example, FIG. 6 shows the pure consumption component 600 of the residual load data 400 of FIG. 4. The pure consumption component 600 is shown in graph form with the x-axis comprising time values and the y-axis with comprising load values. In this example, the pure consumption component 600 is the residual load 400 of FIG. 4 minus the PV contribution 500 of FIG. 5. The analyzer 122 utilizes the PV contribution data 500 and the consumption data 600 to dynamically adjust power/energy generation; forecast residual load, demand, consumption, and generation; schedule power plant energy generation; optimally utilize demand response and smart grid technologies; perform power market operation; economic analysis of the power network; and/or the like.

Operational Flow Diagrams

Figure 7:
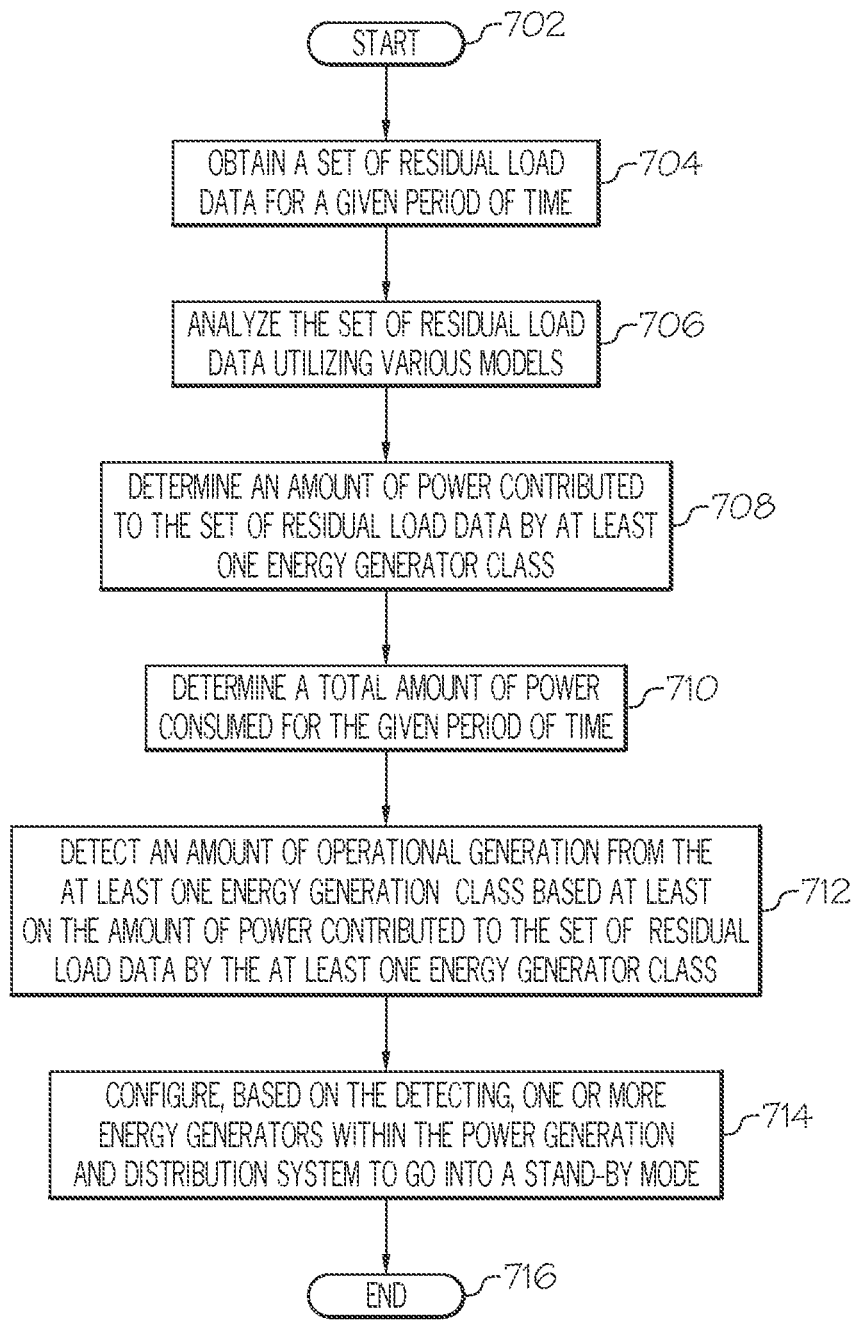
FIG. 7 is an operational flow diagram illustrating one process of energy generation in a power generation and distribution system according to one embodiment of the present disclosure.

FIG. 7 is an operational flow diagram illustrating one example of managing energy generation in a power generation and distribution system. The operational flow diagram of FIG. 7 begins at step 702 and flows directly to step 704. The energy generation manager 120, at step 704, obtains a set of residual load data 116 for a given period of time measured at one or more nodes within a power generation and distribution system 102. The set of residual load data 116 encodes a set of power flow signals, where the set of power flow signals comprise at least one power generation component and a power consumption component.

The energy generation manager 120, at step 706, analyzes the set of residual load data 16 based on a first model representing power generation characteristics for at least one energy generator class and a least a second model representing power generation characteristics and consumption characteristics for a set of energy generator classes and a set of consumer classes, respectively. The set of energy generator classes excludes the at least one energy generator class. In one embodiment, the analyzing comprises optimizing the first and second models utilizing the set of residual load data 116 according to FIG. 4 discussed above. However, if the models have been previously optimization and this optimization is still valid, the residual load data 116 can be applied to the optimized models without requiring the optimization process to be performed.

The energy generation manager 120, at step 708, determines an amount of power contributed to the set of residual load data 116 by the at least one energy generator class. The energy generation manager 120, at step 710, also determines a total amount of power consumed for the given period of time based on the analysis. The energy generation manager 120, at step 712, detects an amount of operational generation from the at least one energy generation class based at least on the amount of power contributed to the set of residual load data by the at least one energy generator class. The energy generation manager 120, at step 714, configures, based on the detecting, one or more energy generators within the power generation and distribution system to go into a stand-by mode. The control flow then exits at step 716.

In another embodiment, the energy generation manager 120, for example, calculates one of a power surplus and a power deficiency of the power generation and distribution system 102 based on at least the amount of power contributed to the set of residual load data 116 by the at least one energy generator class and optional the determined total amount of power consumed. A power surplus indicates that too much power/energy is being (or will be) generated within the system 102. A power deficiency indicates that too little power/energy is being (or will be) generated. The energy generation manager 120 then configures (e.g., dynamically adjusts or schedules) one or more energy generators within the system 102 to one of increase and decrease energy production. For example, based on the amount of power contributed to the set of residual load data 116 by the at least one energy generator class the energy generation manager 120 may determine that NRE generators can now be configured to produce less energy.

Information Processing System

Figure 8:
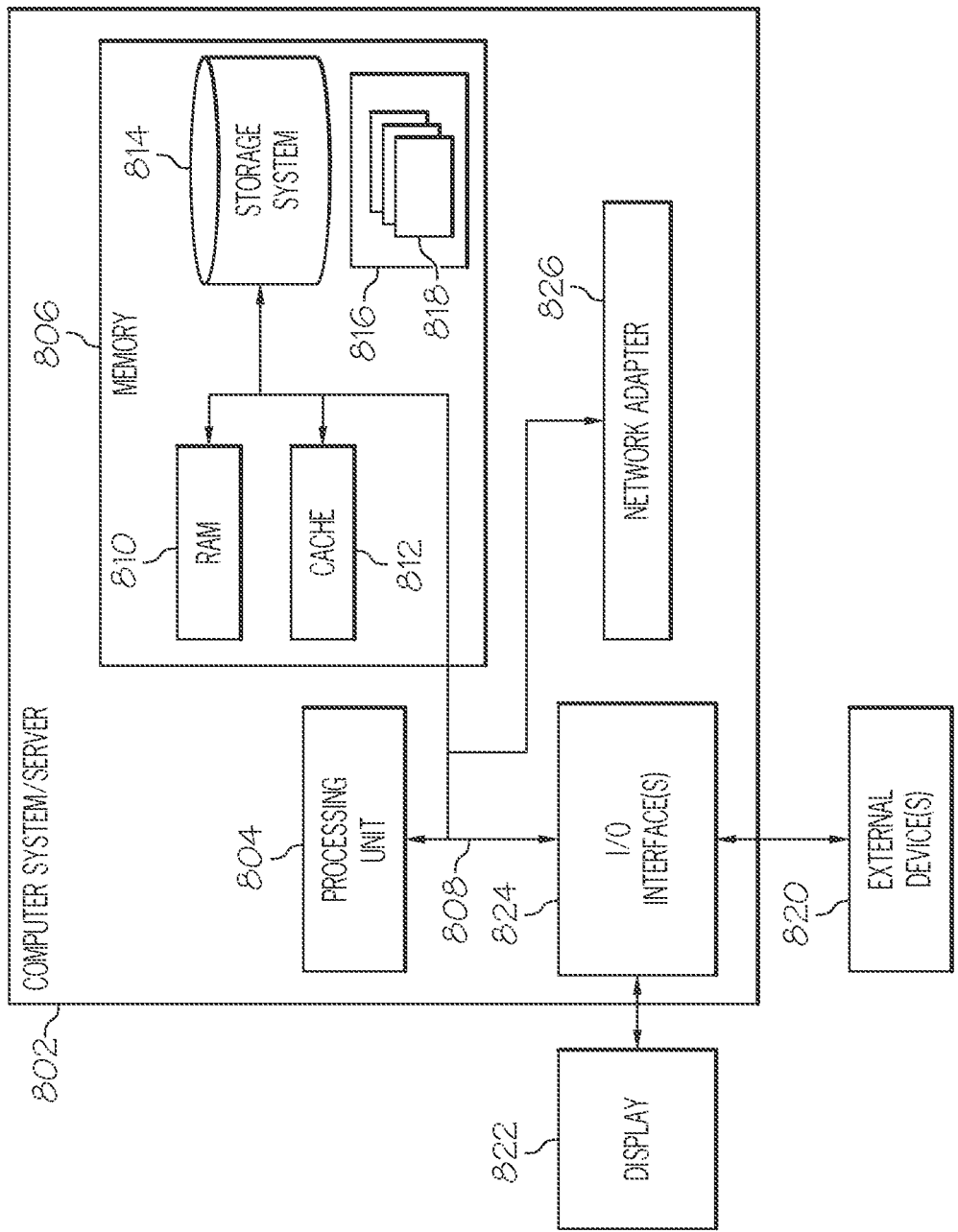
FIG. 8 is a block diagram illustrating one example of an information processing system according to one embodiment of the present disclosure.

Referring now to FIG. 8, this figure is a block diagram illustrating an information processing system that can be utilized in embodiments of the present disclosure. The information processing system 802 is based upon a suitably configured processing system configured to implement one or more embodiments of the present disclosure (e.g., server 108). Any suitably configured processing system can be used as the information processing system 802 in embodiments of the present disclosure. The components of the information processing system 802 can include, but are not limited to, one or more processors or processing units 804, a system memory 806, and a bus 808 that couples various system components including the system memory 806 to the processor 804.

The bus 808 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Although not shown in FIG. 8, the main memory 806 includes the order manager 86, logistics manager 126, communication manager 138, their components, and the various types of data 88, 120, 122, 128, 130, 132, shown in FIG. One or more of these components 120 can reside within the processor 804, or be a separate hardware component. The system memory 806 can also include computer system readable media in the form of volatile memory, such as random access memory (RAM) 810 and/or cache memory 812. The information processing system 802 can further include other removable/non-removable, volatile/non-volatile computer system storage media. By way of example only, a storage system 814 can be provided for reading from and writing to a non-removable or removable, non-volatile media such as one or more solid state disks and/or magnetic media (typically called a "hard drive"). A magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to the bus 808 by one or more data media interfaces. The memory 806 can include at least one program product having a set of program modules that are configured to carry out the functions of an embodiment of the present disclosure.

Program/utility 816, having a set of program modules 818, may be stored in memory 806 by way of example, and not limitation, as well as an operating system, one or more application programs, other program modules, and program data. Each of the operating system, one or more application programs, other program modules, and program data or some combination thereof, may include an implementation of a networking environment. Program modules 818 generally carry out the functions and/or methodologies of embodiments of the present disclosure.

The information processing system 802 can also communicate with one or more external devices 820 such as a keyboard, a pointing device, a display 822, etc.; one or more devices that enable a user to interact with the information processing system 802; and/or any devices (e.g., network card, modem, etc.) that enable computer system/server 802 to communicate with one or more other computing devices. Such communication can occur via I/O interfaces 824. Still yet, the information processing system 802 can communicate with one or more networks such as a local area network (LAN), a general wide area network (WAN), and/or a public network (e.g., the Internet) via network adapter 826. As depicted, the network adapter 826 communicates with the other components of information processing system 802 via the bus 808. Other hardware and/or software components can also be used in conjunction with the information processing system 802. Examples include, but are not limited to: microcode, device drivers, redundant processing units, external disk drive arrays, RAID systems, tape drives, and data archival storage systems.

Non-Limiting Embodiments

As will be appreciated by one skilled in the art, aspects of the present disclosure may be embodied as a system, method, or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit", "module", or "system."

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer maybe connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present disclosure has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The invention claimed is:

1. A method for managing energy generation in a power generation and distribution system, the method comprising:
   obtaining a set of power flow signals measured at a plurality of components within a power generation and distribution system;
   calculating residual load data for a given period of time, the residual load data being based on the set of power flow signals;
   analyzing the residual load data using at least one model, the at least one model determining an amount of power contributed to the residual load data by at least one energy generator class and determining an amount of power contributed to the residual load data by a subset of energy generator class;
   determining, based on the analyzing, an amount of power consumed during the given period of time;
   detecting an amount of operational generation from the at least one energy generator class based at least on the amount of power contributed to the residual load data by at least one energy generator class; and
   configuring one or more energy generators within the power generation and distribution system to increase or decrease energy production based on the detecting.

2. The method of claim 1, wherein the subset of energy generator class excluding the one energy generator class.

3. The method of claim 1 further comprising, when the at least one model was not previously tuned within the given period of time, then tuning the at least one model.

4. The method of claim 3, wherein the tuning the at least one model comprises:
   constructing a joint model based on the at least one model, and a set of joining parameters based on the at least a first portion of the at least one model;
   tuning the at least a first portion of the at least one model according to an objective function with a set of parameters in the at least a second portion of the at least one model and the set of joining parameters being fixed;
   tuning the at least a second portion of the at least one model and the set of joining parameters according to the objective function with a set of parameters in the at least a first portion of the at least one model being fixed;
   analyzing the residual load data using the tuned at least a first portion of the at least one model to determine an amount of power of the set of power flow signals attributed to one or more energy generators classified by the at least one energy generator class;

analyzing the residual load data using the tuned at least a second portion of the at least one model to determine an amount of power of the set of power flow signals attributed to one or more energy generators classified by the subset of energy generator classes; and configuring, based on the analyzing, the one or more energy generators within the power generation and distribution system to increase or decrease energy production.

5. The method of claim 4, wherein the set of joining parameters in the at least a first portion of the at least one model is outputted as a physical property of the at least one energy generator class.

6. The method of claim 1, wherein the at least one energy generator class includes the one or more power generators within the power generation distribution system.

7. An information processing system for managing energy generation in a power generation and distribution system, the information processing system comprising:

a memory; and at least one processor in communication with the memory, the memory including instructions to configure the at least one processor to:

obtain a set of power flow signals measured at a plurality of components within a power generation and distribution system;

calculate residual load data for a given period of time, the residual load data being based on the set of power flow signals;

analyze the residual load data using at least one model, the at least one model determining an amount of power contributed to the residual load data by at least one energy generator class and determining an amount of power contributed to the residual load data by a subset of energy generator class;

determine, based on the analyzing, an amount of power consumed during the given period of time;

detect an amount of operational generation from the at least one energy generator class based at least on the amount of power contributed to the residual load data by at least one energy generator class; and configure one or more energy generators within the power generation and distribution system to increase or decrease energy production based on the detecting.

8. The information processing system of claim 7, wherein the subset of energy generator class excluding the one energy generator class.

9. The information processing system of claim 7, the memory including instructions to configure the at least one processor to, when the at least one model was not previously tuned within the given period of time, then the at least one model.

10. The information processing system of claim 9, wherein the instructions to configure the at least one processor to tune the at least one model comprises the instructions to configure the at least one processor to:

construct a joint model based on the at least one model, and a set of joining parameters based on the at least a first portion of the at least one model;

tune the at least a first portion of the at least one model according to an objective function with a set of parameters in the at least a second portion of the at least one model and the set of joining parameters being fixed;

tune the at least a second portion of the at least one model and the set of joining parameters according to the objective function with a set of parameters in the at least a first portion of the at least one model being fixed;

analyze the residual load data using the tuned at least a first portion of the at least one model to determine an amount of power of the set of power flow signals attributed to one or more energy generators classified by the at least one energy generator class;

analyze the residual load data using the tuned at least a second portion of the at least one model to determine an amount of power of the set of power flow signals attributed to one or more energy generators classified by the subset of energy generator classes; and configure, based on the analyzing, the one or more energy generators within the power generation and distribution system to increase or decrease energy production.

11. The information processing system of claim 10, wherein the set of joining parameters in the at least a first portion of the at least one model is outputted as a physical property of the at least one energy generator class.

12. The information processing system of claim 7, wherein the at least one energy generator class includes the one or more power generators within the power generation distribution system.

13. A computer program product for managing energy generation in a power generation and distribution system, the computer program product comprising:

a storage medium readable by a processing circuit and storing instructions for execution by the processing circuit for performing a method, the method comprising:

obtaining a set of power flow signals measured at a plurality of components within a power generation and distribution system;

calculating residual load data for a given period of time, the residual load data being based on the set of power flow signals;

analyzing the residual load data using at least one model, the at least one model determining an amount of power contributed to the residual load data by at least one energy generator class and determining an amount of power contributed to the residual load data by a subset of energy generator class;

determining, based on the analyzing, an amount of power consumed during the given period of time;

detecting an amount of operational generation from the at least one energy generator class based at least on the amount of power contributed to the residual load data by at least one energy generator class; and configuring one or more energy generators within the power generation and distribution system to increase or decrease energy production based on the detecting.

14. The computer program product of claim 13, wherein the subset of energy generator class excluding the one energy generator class.

15. The computer program product of claim 13, the method further comprising, when the at least one model was not previously tuned within the given period of time, then tuning the at least one model.

16. The computer program product of claim 15, wherein the tuning the at least one model comprises:

constructing a joint model based on the at least one model, and a set of joining parameters based on the at least a first portion of the at least one model;

tuning the at least a first portion of the at least one model according to an objective function with a set of parameters in the at least a second portion of the at least one model and the set of joining parameters being fixed;

tuning the at least a second portion of the at least one model and the set of joining parameters according to the objective function with a set of parameters in the at least a first portion of the at least one model being fixed;

analyzing the residual load data using the tuned at least a first portion of the at least one model to determine an amount of power of the set of power flow signals attributed to one or more energy generators classified by the at least one energy generator class;

analyzing the residual load data using the tuned at least a second portion of the at least one model to determine an amount of power of the set of power flow signals attributed to one or more energy generators classified by the subset of energy generator classes; and configuring, based on the analyzing, the one or more energy generators within the power generation and distribution system to increase or decrease energy production.

17. The computer program product of claim 16, wherein the set of joining parameters in the at least a first portion of the at least one model is outputted as a physical property of the at least one energy generator class.

18. The computer program product of claim 13, wherein the at least one energy generator class includes the one or more power generators within the power generation distribution system.

* * * * *